(12) United States Patent
Seki (10) Patent No.: US 12,187,559 B2
(45) Date of Patent: Jan. 7, 2025

(54) POWDER SUPPLY DEVICE

(71) Applicant: TSUKASA CO., LTD., Aichi (JP)

(72) Inventor: Tomonori Seki, Aichi (JP)

(73) Assignee: TSUKASA CO., LTD., Aichi (JP)

( * ) Notice: Subject to any disclaimer, the term of this patent is extended or adjusted under 35 U.S.C. 154(b) by 12 days.

(21) Appl. No.: 18/192,148

(22) Filed: Mar. 29, 2023

(65) Prior Publication Data

US 2023/0227277 A1 Jul. 20, 2023

Related U.S. Application Data

(63) Continuation of application No. PCT/JP2021/040292, filed on Nov. 1, 2021.

(30) Foreign Application Priority Data

Nov. 3, 2020 (JP) .................................. 2020-184019

(51) Int. Cl.
*B65G 69/18* (2006.01)
*B65B 1/28* (2006.01)
(Continued)

(52) U.S. Cl.
CPC .............. *B65G 69/186* (2013.01); *B65B 1/28* (2013.01); *B65B 1/36* (2013.01); *B65G 65/32* (2013.01);
(Continued)

(58) Field of Classification Search
CPC ...... B65G 69/18; B65G 69/186; B65G 65/32; B65G 2201/04; B65G 2201/042; B65B 1/28; B65B 1/36
See application file for complete search history.

(56) References Cited

U.S. PATENT DOCUMENTS 4,699,187 A * 10/1987 Binzen ................. B65G 69/186
141/93
5,052,451 A * 10/1991 Gentilcore ................ B65B 1/28
55/374
(Continued)

FOREIGN PATENT DOCUMENTS

ES 2316129 T3 * 4/2009 ......... G03G 15/0855
JP 01-071627 U1 5/1989
(Continued)

OTHER PUBLICATIONS

International Search Report from International Application No. PCT/JP2021/040292 mailed Jan. 25, 2022.

Primary Examiner — Nicolas A Arnett
(74) Attorney, Agent, or Firm — Shih IP Law Group, PLLC (57) ABSTRACT

A purpose of the invention is to provide a powder supply device having a dust collection unit to collect powdery dust released when powder is supplied from a lateral side, and having a space-saving and simplified structure. A powder supply device according to the present invention has a main body, a plurality of stockers and a dust collection unit. The stocker has a charge port and a supplier. The dust collection unit has a casing, an exhauster and a filtering member. The casing has a ceiling portion and a lateral side portion, with a side opposing said ceiling portion being opened to form a lid-shaped configuration. The lateral side portion has a notched portion into which the supplier is to be inserted. The filtering member is provided inside the casing and is positioned above the notched portion and below the ceiling portion in order to collect the powder.

4 Claims, 4 Drawing Sheets

(51) Int. Cl.
*B65B 1/36* (2006.01)
*B65G 65/32* (2006.01)
(52) U.S. Cl.
CPC .... *B65G 2201/04* (2013.01); *B65G 2201/042* (2013.01)

(56) References Cited

U.S. PATENT DOCUMENTS

| | | | | | |
|---|---|---|---|---|---|
| 5,573,044 | A | * | 11/1996 | Mechalas | B65B 1/32 141/10 |
| 7,833,318 | B2 | * | 11/2010 | Snowdon | B65G 53/22 406/197 |
| 2011/0083770 | A1 | * | 4/2011 | Fouad-Fahmi | B65G 69/182 141/85 |
| 2014/0348597 | A1 | * | 11/2014 | Moretto | B65G 53/04 406/31 |
| 2023/0107336 | A1 | * | 4/2023 | Seki | B65G 65/46 222/136 |

FOREIGN PATENT DOCUMENTS

| | | |
|---|---|---|
| JP | 3005747 U | 1/1995 |
| JP | 2001-130748 A | 5/2001 |
| JP | 2005-263468 A | 9/2005 |
| JP | 3152723 U | 8/2009 |
| JP | 2011-042448 A | 3/2011 |
| JP | 2014-227302 A | 12/2014 |
| JP | 2018-122922 A | 8/2018 |

\* cited by examiner

POWDER SUPPLY DEVICE

TECHNICAL FIELD

The present invention relates to a powder supply device, and more particularly relates to a powder supply device having a dust collection unit to collect powdery dust released when powder is supplied.

BACKGROUND ART

Upon putting powder down into a filling container or measuring container, powdery dust is released depending on the particle size of the powder. When an operator breathes the powdery dust, the powdery dust may give a harmful influence on the human body. The powdery dust which spreads around a working place may deteriorate a surrounding visibility and soil the working place where a powder supply operation is held. This deteriorates the working environment, and thus likely leads to human errors such as mistakes during confirming processes, mistakes during operations of equipments or the like.

Patent Literature 1 discloses a dust collection hood which is placed to surround a gap between a first container to accommodate powder and a second container arranged to be positioned under the first container. The dust collection hood has an upper side in which an upper opening portion is provided to supply the powder, and has a lateral side in which a lateral opening portion is provided to perform a working operation for the first container. The dust collection hood further has a plurality of dust collection openings provided to suck the powdery dust released during a powder supplying operation, and has a flow straightener means which is provided to vertically extend down from the upper opening portion to a lower proximity of the lateral opening portion, in order to straighten an aerial flow toward the dust collection openings from the upper opening portion and the lateral opening portion.

Patent Literature 2 discloses a hopper device provided to throw powder into a container through a powder supply port. The hopper device has a hopper portion, a throwing hole and an exhaust hole provided to be in communication with the throwing hole. The hopper portion has a dust sucking hole which is arranged to be in juxtaposition with the exhaust hole. The hopper device further has a dust sucking and collecting device which sucks the powdery dust through the dust sucking hole to collect the sucked powdery dust in order to provide the hopper device with a dust-preventive function.

Patent Literature 3 discloses a dust collection device for use in a powder measurement device in which a powder supply hole, through which powder is dropped into a measurement container placed on a measurement instrument, is provided above the measurement instrument. The dust collection device has a floor portion on which the measurement instrument is placed, and a ceiling portion which is placed to oppose the floor portion in an upper-and-lower relationship. One of the floor portion or the ceiling portion has a substantially annular air-outlet formed in a manner to surround both the powder supply hole and the measurement instrument so as to blow out an aerial flow. The other of the floor portion or the ceiling portion has a suction hole to draw the aerial flow blown out through the air outlet.

CITATION LIST

Patent Literature

Patent Literature 1: JP2011-42448A
Patent Literature 2: JP2005-263468A
Patent Literature 3: JP01-071627U1

SUMMARY OF INVENTION

Technical Problem

The devices disclosed in Patent Literatures 1 and 2 are structured in a manner to connect the gap between the first container and the second container, in order to collect the powdery dust which is generated when powder is put downward from the first container, such as a flexible container bag or a hopper, placed in a upper site into the second container placed in a lower site. This structure is not suited for a powder supply device such as a belt conveyor or a screw conveyor which supplies powder from a lateral side.

The dust collection hood according to Patent Literature 1 is used in cooperation with a dust collecting device, and cannot be used alone. The hopper device with the dust-preventive function according to Patent Literature 2 has the dust sucking and collecting device in addition to the hopper portion, and the hopper portion cannot be used alone as mentioned above. Accordingly, the devices of Patent Literatures 1, 2 need the dust collection device which is discretely set from a place in which the powdery dust is collected. This resultantly makes the powder supply device larger, and a larger space is needed to place the power supply device.

The device according to Patent Literature 3 has a structure in which an air outlet duct communicated with a blower and a dust collection duct communicated with a dust collecting device are provided above and below the powder supply hole. This makes the powder supply device larger and more complicated, and a larger space is needed to place the power supply device as is the case with the devices of Patent Literatures 1, 2.

Therefore, it is an object of the present invention to provide a powder supply device which has a space-saving construction with a simplified structure and having a dust collection unit to collect powdery dust released upon supplying powder from a lateral side.

Solution to Problem

According to the invention, there is provided a powder supply device having a main body; a plurality of stockers to be connected to the main body and to reserve powder therein; and a dust collection unit. Said stocker has a charge port through which said powder is to be charged into said stocker, and a supplier which has a supply port and which supplies said powder reserved inside said stocker through the supply port. Said dust collection unit has a casing, an exhauster and a filtering member. Said casing includes a ceiling portion and a lateral side portion, with a side opposing said ceiling portion being opened to form a lid-shaped configuration. Said lateral side portion has a notched portion into which said supplier is to be inserted. Said filtering member is provided inside said casing and is positioned above the notched portion and below the ceiling portion in order to collect said powder. Said casing has an inner space divided into a first region and a second region by the filtering member. Said first region is an area below said filtering member. Said second region is an area above said filtering member. Said second region is an area which permits said exhauster to exhaust air inside said second region and permits an entry of air passing through said filtering member.

According to this structure, the powder is supplied to the first region through a lateral side of the casing by means of the supplier which is inserted into the notched portion. The powder falls under the influence of the gravity, and is exhausted outside the casing through the opened side which opposes the ceiling portion. Upon supplying the powder, the powdery dust released in the first region moves upward due to the exhauster which forms an air flow from the first region to the second region, and the powdery dust is collected by the filtering member. Therefore, the powder supply device has the dust collection unit suited to a situation in which the powder is supplied from a lateral side by means of the supplier. This obviates the need to connect to a discrete blower or the like, so as to be space saving with a simplified structure.

In the invention, it is preferable that the dust collection unit has a receiving member provided to receive the powder falling down from the filtering member, and the receiving member is placed above the notched portion and below the filtering member. According to this structure, even when the collected powder falls down from the filtering member, it is possible to receive the falling powder by the receiving member. Therefore, this makes it possible to prevent the powder falling down from the filtering member from flowing out of the casing.

In the invention, it is preferable that said plurality of stockers is radially placed around said dust collection unit, and said stocker has a structure to be detachably connected to the main body, and said supplier has a structure to be detachably inserted into said notched portion, with a central axis of said supplier being directed toward a center of said dust collection unit. According to this structure, the dust collection unit can collect the powdery dust released when the powder is supplied from the plurality of stockers. It is possible to remove the stockers from the main body and the dust collection unit. This makes it possible to simplify the operation upon exchanging the powder supplied from the powder supply device with another powder. Further, it is possible to improve a maintainability of the powder supply device.

In the invention, it is preferable that said dust collection unit is placed above a container with an opened upper side and for measuring the powder, and said main body has a controller to control the supplier to adjust the supply of said powder and further to control an activation of said exhauster. According to this structure, it is possible to efficiently control the supply of the powder by the supplier and the activation of the exhauster, so as to improve a measurement precision of the powder. Further, it is possible to prevent the powdery dust from adhering to the powder supply device, the container or surrounding areas, thereby preventing the deterioration of the working environment.

In the present invention, it is preferable to provide a gap between the dust collection unit and the container, and a size of said gap is adjustable. According to this structure, it is possible to adjust a speed of air flowing into the first region from an outside of the casing.

In the present description, interpretation of words and phrases is as follows: The word of "powder" includes any of granule and a mixture of powder and granule in addition to powder. Usage of the powder may be for food, medicine, civil engineering, architecture, semiconductor or the like, and is not restricted.

The phrase of "supply the powder from the supply port" means to send out the powder outside from the stockers through the supply port.

The word of "exhaust" means to discharge inner gas from inside to outside.

The "exhauster" is represented by a fan by way of illustration. However, any means is available as far as it can discharge air as illustratively represented by a pump or the like.

The "filtering member" is illustratively represented by a filter cloth, however, other means such as filter paper, etc. are adoptable as far as the air or other gaseous material can pass through the filtering means and the filtering means can collect powder.

The phrase of "collected by the filtering member" means that the powder remains inside the filtering member or is retained on a surface of the filtering member without passing through the filtering member when the powder flows toward the filtering member.

The "supplier" is illustratively represented by a screw conveyor or a screw feeder, however, other instruments such as vibrating feeder, belt conveyor, etc. are available as far as the supplier has a transport function for the powder.

The phrase of "to receive the powder" means to retain the powder in the receiving member when the powder falls down from the filtering member.

The phrase of "fall down from the filtering member" means that the powder collected by the filtering member separates from the filtering member and falls down.

The "receiving member" is illustratively represented by a box-like body, a dish-like body, etc., with an opened upper side, and has a structure capable of receiving and retaining the powder inside.

The "powdery dust" means fine particulates of the powder floating or drifting in the air.

The "dust collection" means to collect the powdery dust in one place.

Advantageous Effects of Invention

According to the present invention, it becomes possible to collect the powdery dust released when the powder is supplied from a lateral side, while at the same time, it becomes possible to supply the powder with a space-saving and simplified device.

DESCRIPTION OF EMBODIMENTS

With reference to FIGS. 1 through 4, described below is a power supply device 1 (hereinafter referred to as "a supply device 1"). The supply device 1 has a main body 2, a plurality of stockers 3 for reserving powder P therein and to be connected to the main body 2, and a dust collection unit 4. The supply device 1 further has a container 5 for measuring the powder P, having an opened upper side, and a measurement instrument 6.

The main body 2 has a main body portion 21 and a stand frame 22 provided to support the main body portion 21, and the stocker 3 is detachably connected to the stand frame 22. The main body portion 21 has a controller 211, which controls a supplier 32 (described later) to adjust a supply of the powder P, with the main body 2 being connected to the stocker 3, and controls an exhauster 42 (also described later), with the main body 2 being connected to the dust collection unit 4. These controls are manually feasible or automatically operable by a predetermined setting.

Figure 1:
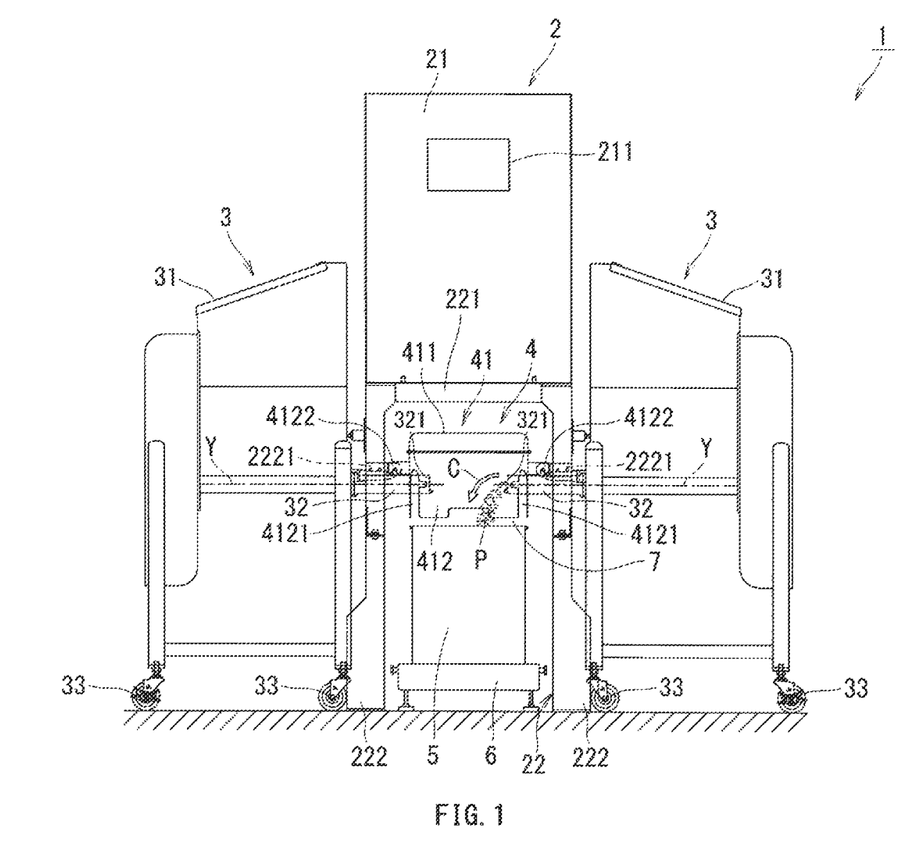
FIG. 1 is a front view of a powder supply device according to the present embodiment.
Figure 2:
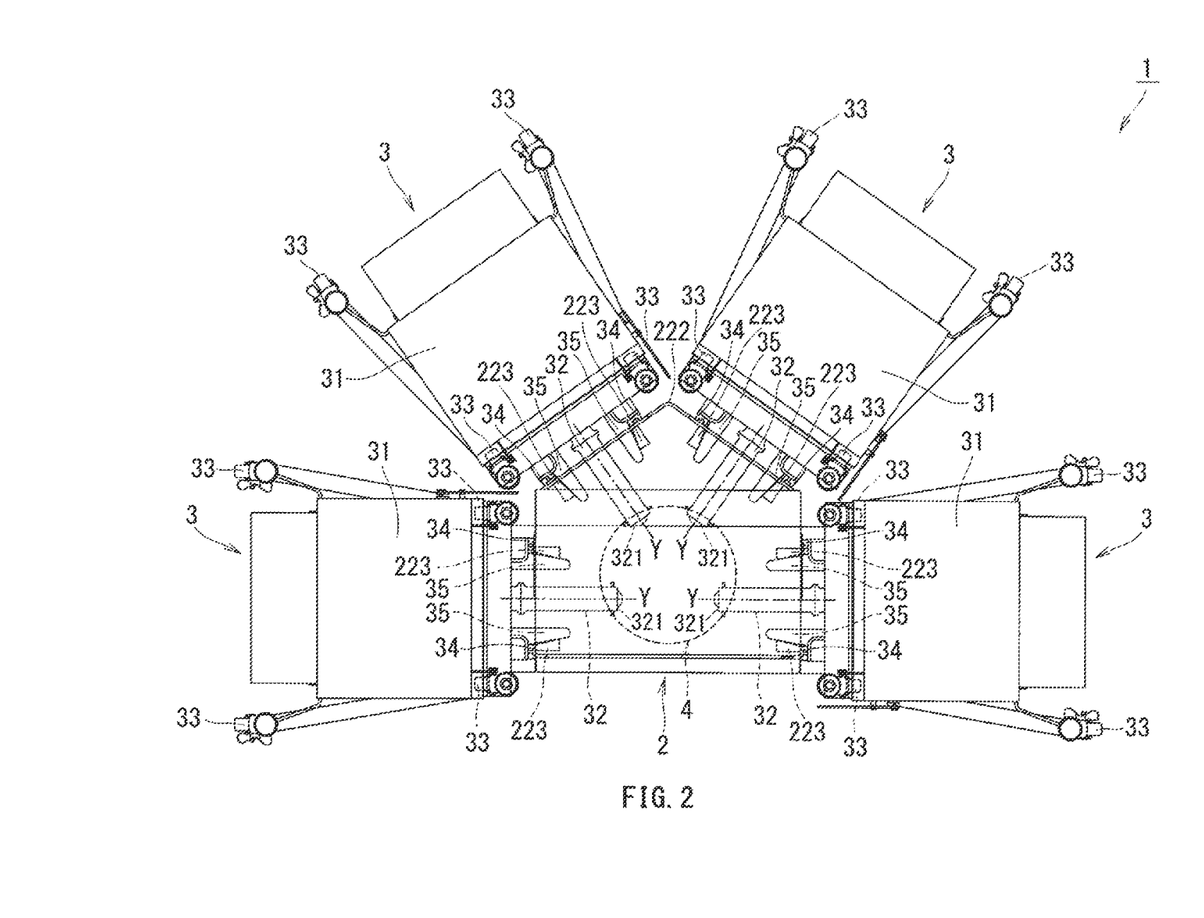
FIG. 2 is a plan view of the powder supply device according to the present embodiment.
Figure 4:
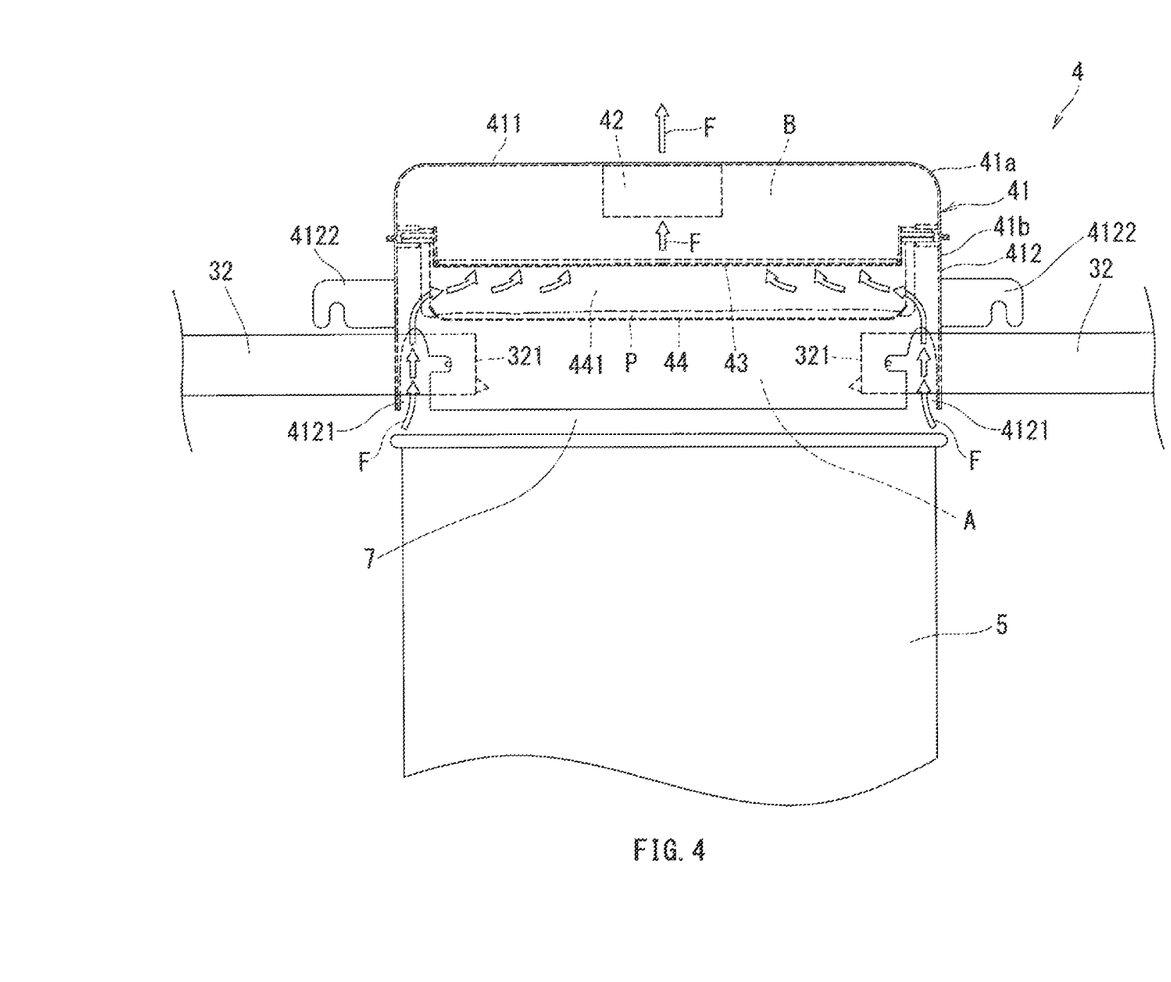
FIG. 4 is a front view of the dust collection unit into which the supplier is inserted according to the present embodiment.

The stand frame 22 is hollow inside and includes a pedestal portion 221 provided to place the main body portion 21, and leg portions 222, and further includes guide receiving members 223 into which guides 35 (described later) are to be fit when the stocker 3 is inserted into the main body 2. The stand frame 22 further has fixing members 2221 which can fix fixed members 4122 (described later) provided on the dust collection unit 4. The fixing member 2221 is mounted on the leg portion 222 and extends toward an inner side of the stand frame 22. The height of the mounting of the fixing member 2221 is changeable and adjustable. Inside the stand frame 22, provided are the dust collection unit 4, the measurement instrument 6 and the container 5 which can reserve the powder P and which is placed on the measurement instrument 6. At a lateral side portion 412 (described later) of the dust collection unit 4, the dust collection unit 4 has the fixed member 4122 which is to be fixed to the fixing member 2221. The dust collection unit 4 is fixed to the leg portions 222 by the fixed members 4122 and fixing members 2221, and placed above the container 5 set on the measurement instrument 6. Between the dust collection unit 4 and the container 5, a gap 7 is provided through which air flows to be introduced into the dust collection unit 4 as shown in FIGS. 1 and 4.

The stocker 3 includes a charge port 31 through which the powder P is to be charged therein, and the supplier 32 having a supply port 321. The supplier 32 supplies the powder P reserved inside the stocker 3 from the supply port 321. The powder P reserved inside the stocker 3 is supplied from the supply port 321 through the supplier 32. By way of illustration, when the powder P is supplied from the stocker 3 (placed at the right side in FIG. 1) to the container 5, the powder P is sent out from the supply port 321 in a direction as shown by an arrowed line C. The supplier 32 in this embodiment is a cylindrical screw feeder. The stocker 3 further has a plurality of casters 33, one or more of the casters 33 being with a rotary stopper, at the bottom. The stocker 3 further has elastic members 34 and the guides 35 which are to be inserted into the main body 2. The stockers 3 are movable in any direction with the use of the casters 33.

The plurality of stockers 3 (four stockers herein) is radially positioned around the dust collection unit 4, and the stocker 3 is detachably connected to the main body 2. The structure may be illustratively represented by a mechanical insertion and drawing structure. Upon mounting the stocker 3 to the main body 2, the stocker 3 is pushed into the main body 2 so as to insert the guide 35 into the main body 2. Upon separating (detaching) the stocker 3 from the main body 2, the stocker 3 is pulled out of the main body 2 to withdraw the guide 35 from the main body 2. Under the condition that the stocker 3 is mounted to the main body 2, the guide 35 is inserted into the main body 2, while at the same time, the guide 35 is fit into the guide receiving member 223. This makes it possible to secure the stocker 3 to the main body 2 so as to prevent a deviation of the direction of a central axis Y of the supply port 321. The elastic member 34 has an elasticity to absorb an impact due to an elastic deformation, and is positioned outside of the guide 35 to be in contact with the main body 2 when the stocker 3 is mounted to the main body 2. When the stocker 3 is subjected to an outside impact unexpectedly, the elastic member 34 absorbs the impact so as to prevent the stocker 3 itself from contacting against the main body 2, thus avoiding the stocker 3 to get damaged.

The supplier 32 has a structure to be detachably inserted into a notched portion 4121 (described later) of the dust collection unit 4, and is set, with the central axis Y of the supplier 32 being directed toward the center of the dust collection unit 4.

When the stocker 3 is mounted to the main body 2, with the vicinity of a leading end of the supplier 32 including the supply port 321 being inserted into the stand frame 22, and with the supplier 32 being inserted into the notched portion 4121, the supply port 321 is placed inside a first region A (described later), and positioned above an upper opening of the container 5. Other parts of the supplier 32 reside within an inner space of the stocker 3. The powder P reserved inside the stocker 3 is supplied into the supplier 32 through an opening of the supplier 32.

Upon mounting the stocker 3 to the main body 2, the stocker 3 is moved to the position in which the powder P is supplied. Then, together with the guide 35 of the stocker 3, the vicinity of the leading end of the supplier 32 including supply port 321 is brought inside the stand frame 22 of the main body 2 to make the guide 35 fit into the guide receiving member 223. Thereafter, the rotary stopper of the caster 33 is operated to fixedly place the stocker 3 in the position, and the main body 2 and the stocker 3 are connected via a cable wire (not shown) to complete the mounting. On the other hand, upon separating the stocker 3 from the main body 2, the cable wire which connects the stocker 3 to the main body 2 is taken out. In order to separate the stocker 3 from the main body 2, the rotary stopper of the caster 33 is cancelled to pull the stocker 3 out of the main body 2 so as to relocate the stocker 3 from the place in which the powder P is supplied. The stocker 3 is attached to and detached from the main body 2 with ease to make the mounted stocker 3 readily exchangeable with other stockers 3. Namely, the individual stockers 3 are mounted to the main body 2 in an exchangeable relationship with other stockers 3.

Since the stocker 3 is easily exchangeable with other stockers 3, it is possible to easily exchange one kind of the powder P with other kind powder which is to be supplied to the container 5. With the stocker 3 detachably mounted to the main body 2, it is possible to check and adjust the stocker 3, with the stocker 3 taken out of the main body 2, so as to ameliorate a maintainability of the supply device 1. For example, when the supplier 32 would be in trouble, its repair and replacement would be carried out with ease.

The dust collection unit 4 has a casing 41 and a filtering member 43 in addition to the exhauster 42. The casing 41 is generally cylindrical in shape, and has a side portion 412 and a ceiling portion 411, with a side opposing said ceiling portion 411 being opened to form a lid-shaped configuration. The side portion 412 has the notched portion 4121 into which the supplier 32 is to be inserted. The casing 41 has a lower casing portion 41b and an upper casing portion 41a which includes the ceiling portion 411. Each of the lower casing portion 41b and the upper casing portion 41a has a flange, and they are structurally connected to each other via the flanges.

In this embodiment, the exhauster 42 is a fan which is placed on the ceiling portion 411. The location to place the exhauster 42 is not limited to the ceiling portion 411, any location is available as far as the filtering member 43 (described later) can collect the powdery dust inside the first region A (described later) by activation of the exhauster 42. As another example of the location of the exhauster 42, a location on the side portion 412 inside a second region B (described later) is applicable. As an example of the exhauster 42, a pump is applicable other than the fan, however, the exhauster 42 is not limited in particular, and any means is applicable as far as it has an exhaust function.

The filtering member 43 is located inside the casing 41 above the notched portion 4121 and under the ceiling portion 411. The filtering member 43 can collect the powder P. In this embodiment, the filtering member 43 is a filter cloth. Other than the filter cloth, a filter paper can be adopted, for example. However, the filtering member 43 is not limited in particular. Any material is applicable as far as it has a filtering function.

A mesh opening and thickness of the filtering member 43 is not limited in particular, and appropriately changeable depending on the particle diameter of the powder P to be collected as far as the filtering member 43 is able to collect the supplied powder P, and as far as the flowing quantity of the air passing through the filtering member 43 is not excessively lowered.

The casing 41 has an inner space divided into the first region A and the second region B via the filtering member 43. The first region A is an area under the filtering member 43. The second region B is an area above the filtering member 43, and inner air in the second region B is exhausted by the exhauster 42, while an air flow is permitted to enter the second region B when the air flow passes through the filtering member 43. When the exhauster 42 is activated, air is taken into the first region A through the opened side which opposes the ceiling portion 411. Then, the air passes through the filtering member 43 to flow into the second region B, so as to be exhausted outside the casing 41 through the exhauster 42.

Under the condition that the supplier 32 is inserted into the notched portion 4121, the supply port 321 is positioned inside the first region A. At the time of supplying the powder P from the supply port 321, released is the powdery dust, which flows toward the filtering member 43 in accompany with the air flow inside the casing 41, and is collected by the filtering member 43. This makes it possible to prevent the working environment from deteriorating when the powdery dust is released in accompany with the supply of the powder P.

The dust collection unit 4 is situated above the container 5 which is placed on the measurement instrument 6. Since the powdery dust is collected by the dust collection unit 4, it is possible to prevent the powdery dust from adhering to the inner and outer surfaces of the container 5, even when the powdery dust is released in accompany with the supply of the powder P through the supply port 321.

Figure 3:
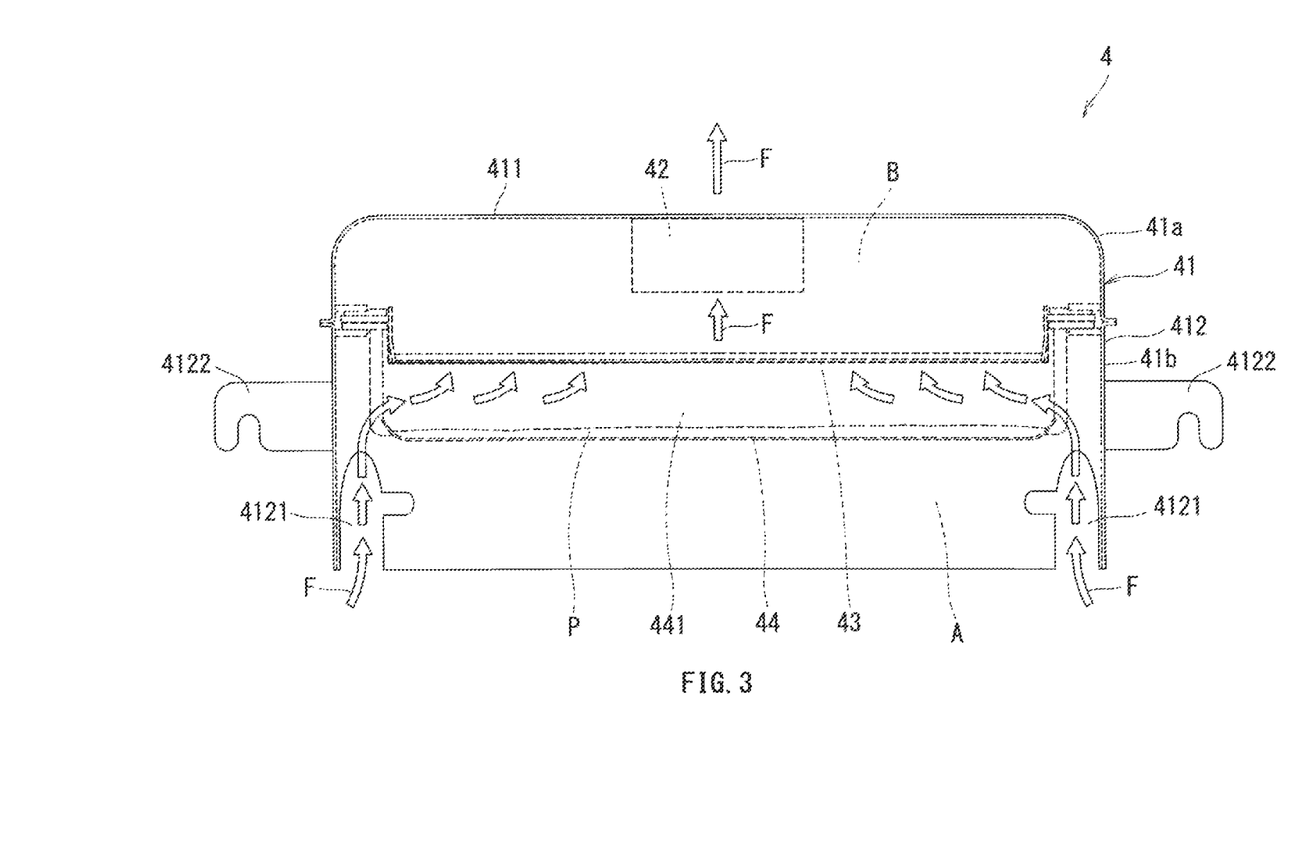
FIG. 3 is a front view of a dust collection unit according to the present embodiment.

The dust collection unit 4 further has a receiving member 44 which is positioned above the notched portion 4121 and under the filtering member 43, and receives the powder P falling down from the filtering member 43. As shown in FIGS. 3 and 4, the powder P fallen from the filtering member 43 is retained inside the receiving member 44. In this embodiment, the receiving member 44 is formed into a circular dish-shaped configuration, having an opening 441 on an upper side.

By way of example, the receiving member 44 preferably has the opening 441, an upper portion of which flares out like a trumpet-like configuration. This makes it possible to improve an effect to receive the powder P falling from the filtering member 43.

As for the configuration of the receiving member 44, the configuration is not limited in particular. Any configuration would be usable for the receiving member 44 as far as the receiving member 44 has the opening 441 and can receive the powder P which falls from the filtering member 43. By way of illustration, the configuration of the receiving member 44 may be a rectangular parallelepiped body, a circular body, an ellipsoidal body a polygonal body, etc., each with the opening 441 directed upward.

As for the scale of the receiving member 44, the scale is not limited in particular as far as the scale is enough to receive the powder P falling from the filtering member 43. The scale would be determined from the viewpoint to avoid an interference with other members such as the casing 41 or the like, and also from the viewpoint to prevent a decrease of the air flow inside the casing 41.

As for the material of the receiving member 44, the material is not limited in particular. Existing materials for the receiving member 44 can be appropriately usable depending on the character of the powder P. By way of example, an existing thermosetting resin, a thermoplastic resin, a metallic material such as stainless steel or the like is usable for the receiving member 44.

The measurement instrument 6 is able to measure a weight of the powder P which is supplied from the supply device 1 and reserved in the container 5. By connecting the main body 2 and the measurement instrument 6 through a cable wire (not shown), the main body 2 can control the flowing quantity of the powder P supplied from the stocker 3 in accordance with the weight of the powder P reserved in the container 5 and measured by the measurement instrument 6. Over the measurement instrument 6, a conveyor may be installed in order to make the container 5 transferable. By adopting such a measurement instrument 6 as mentioned above, the installation and the transfer of the container 5 would be easily carried out. As an example of the conveyor, a roller conveyor, a belt conveyor or the like is applicable. For the supply device 1, it is possible to prevent the powdery dust from adhering to the inside or outside of the container 5, while at the same time, it is possible to control the flowing quantity of the powder P supplied from the stocker 3 by the main body 2. This enables the supply device 1 to supply the powder P of a predetermined weight from the stocker 3 to the container 5 with a high precision.

The supply device 1 has such a structure as to make a gap 7 adjustable (in width) between the dust collection unit 4 and the container 5 by adjusting a fixing position of the dust collection unit 4 to the leg portion 222.

With the exhauster 42 activated, air flows into the first region A from the outside of the casing 41, the air flow speed changes depending on the size of the gap 7. With a decrease of the size of the gap 7, it is possible to increase the speed of the air flowing into the first region A from the outside of the casing 41, thus enabling the dust collection unit 4 to collect the powder with a larger particle diameter. The size of the gap 7 may be determined appropriately in accordance with the particle diameter of the supplied powder P.

A method to adjust the size of the gap 7 is not limited in particular. The method is exemplified by adjusting the fixed position of the dust collection unit 4 to the leg portion 222, or by adjusting a height of the measurement instrument 6.

Procedures how to operate the supply device 1 is described as follows: First, the dust collection unit 4 is installed. The dust collection unit 4 is fixed to the leg portion 222 after determining the fixing position. The size of the gap 7 is determined by considering the particle diameter of the supplied powder P, and then the fixing position is determined by considering the gap size, the height of the container 5 and the measurement instrument 6.

The stocker 3 is mounted to the main body 2. The number of the stockers 3 mounted to the main body 2 is discretionally determined. By considering the sort and quantity of the supplied powder P, it would be possible to determine the number of the stockers 3 to be mounted. The timing to charge the powder P into the stocker 3 to reserve the powder P therein, is acceptable at any time before the powder P is supplied from the stocker 3. However, it is preferable to mount the stocker 3 to the main body 2 after the powder P is charged into the stocker 3 considering operability.

By operating the controller 211 in the main body 2, the powder P is supplied from the stocker 3 which is mounted to the main body 2. In this instance, the exhauster 42 is activated to generate an air flow F which flows into the casing 41 from the gap 7, and passes through the first region A, the filtering member 43, the second region B and the exhauster 42 in turn to be exhausted outside the casing 41 as shown in FIGS. 3 and 4. Since the powdery dust released upon supplying the powder P from the stocker 3, flows toward the filtering member 43 due to the air flowing inside the casing 41, it is possible to collect the powdery dust by the filtering member 43.

Upon manually or automatically ceasing the supply of the powder P from the stocker 3, the exhauster 42 is deactivated to stop after a predetermined elapse of time period from the supply cessation of the powder P from the stocker 3 to the container 5. This means that the exhauster 42 is kept activated while the powder P is being supplied. This prevents the powdery dust from being released after the exhauster 42 is deactivated to stop.

Start and cessation of supplying the powder P from the stocker 3 may be repeatedly carried out in any number of time depending on the working condition. In this instance, the exhauster 42 is activated at the time when the powder P is firstly supplied from the stocker 3, and the exhauster 42 is ceased after a predetermined elapse of time period from an end of all the repetitive supply of the powder P. This prevents the powdery dust from being released after the exhauster 42 is deactivated to stop.

When the powder P is supplied from the plurality of stockers 3, each of the stockers 3 individually supplies the powder P in turn one by one. In this instance, the exhauster 42 is activated at the time when the supply of the powder P from the first stocker 3 is started, and the exhauster 42 ceases after a predetermined elapse of time period from an end of the supply of the powder P from the last stocker 3. This makes it possible to prevent the powdery dust from being released after the exhauster 42 is ceased.

When it is judged that the weight of the powder P reserved in the container 5 reaches a predetermined quantity based on the measurement of the measurement instrument 6, the powder supply procedure ends and the container 5 is transferred outside. After the container 5 is transferred outside, another container 5 is installed to carry out a next powder supply procedure.

After the powder supply procedures are finished, the stocker 3 is detached to be separated from the main body 2.

As described above, the supply device 1 makes it possible to collect the powdery dust released when the powder P is supplied from the lateral side by the supplier 32, so as to prevent the deterioration of the working environment with a space-saving and simplified structure. Further, the supply device 1 prevents the fallen powder P from flowing outside the dust collection unit 4 when the powder P falls from the filtering member 43. Furthermore, the supply device 1 makes it possible to efficiently control the supplier 32 and the exhauster 42, so as to measure the weight of the powder P with a high precision. The supply device 1 also makes it possible to adjust the air flow speed flowing into the dust collection unit 4 depending on the particle diameter of the supplied powder P.

The present invention is not limited to the above embodiment, and any modifications and variations may be made without deviating from the spirit and scope of the concept and idea regarding the present invention. These modifications and equivalents are within the technological scope of the present invention. By way of example, the number of the stockers 3 mounted to the main body 2 may be appropriately adopted such as one, two, three, five or the like, instead of four in the above embodiment. The dust collection unit 4, which is used to measure the weight of the powder P supplied to the container 5 in the above embodiment, can be also applied to other types of powder processing devices.

REFERENCE SIGNS LIST

1 . . . powder supply device
2 . . . main body
21 . . . main body portion
211 . . . controller
22 . . . stand frame
221 . . . pedestal portion
222 . . . leg portion
2221 . . . fixing member
223 . . . guide receiving member
3 . . . stocker
31 . . . charge port
32 . . . supplier
321 . . . supply port
33 . . . caster
34 . . . elastic member
35 . . . guide
4 . . . dust collection unit
41 . . . casing
41a . . . upper casing portion
41b . . . lower casing portion
411 . . . ceiling portion
412 . . . lateral side portion
4121 . . . notched portion
4122 . . . fixed member
42 . . . exhauster
43 . . . filtering member
44 . . . receiving member
441 . . . opening
5 . . . container
6 . . . measurement instrument
7 . . . gap
A . . . first region
B . . . second region
C . . . arrowed line
F . . . air flow
P . . . powder
Y . . . central axis

What is claimed is:
1. A powder supply device, comprising:
a main body;
a plurality of stockers to be connected to the main body and to reserve powder therein; and
a dust collection unit,
wherein:
the stocker includes a charge port through which the powder is to be charged into the stocker, and a supplier which includes a supply port and which supplies the powder reserved inside the stocker through the supply port into a container with an opened upper side and for measuring the powder, the dust collection unit includes a casing, an exhauster and a filtering member and is placed above the container, the casing includes a ceiling portion and a lateral side portion, with a side opposing the ceiling portion being opened to form a lid-shaped configuration, the lateral side portion includes a notched portion into which the supplier is to be inserted, the filtering member is provided inside the casing and is positioned above the notched portion and below the ceiling portion in order to collect the powder, the casing includes an inner space divided into a first region and a second region by the filtering member, the first region is an area below the filtering member, the second region is an area above the filtering member, the second region being an area which permits the exhauster to exhaust air inside the second region and permits an entry of air passing through the filtering member, a gap is provided between the dust collection unit, and the container, a size of the gap is dimensionally adjustable and determined according to a particle diameter of the powder, and a speed of air flowing into the first region from an outside of the casing is changed depending on the size of the gap.

2. The powder supply device according to claim 1, wherein the dust collection unit includes a receiving member provided to receive the powder falling down from the filtering member, and the receiving member is placed above the notched portion and below the filtering member.

3. The powder supply device according to claim 1, wherein the plurality of stockers is radially placed around the dust collection unit, and the stocker has a structure to be detachably connected to the main body, and the supplier has a structure to be detachably inserted into the notched portion, with a central axis of the supplier being directed toward a center of the dust collection unit.

4. The powder supply device according to claim 1, wherein the main body includes a controller to control the supplier to adjust the supply of the powder and further to control an activation of the exhauster.

\* \* \* \* \*